(12) United States Patent
Stover

(10) Patent No.: US 8,683,315 B2
(45) Date of Patent: Mar. 25, 2014

(54) SYSTEM AND METHOD FOR CREATING INTEGRATED WEB FORM AND DATABASE APPLICATIONS

(75) Inventor: Monique Stover, Camarillo, CA (US)

(73) Assignee: ECI Software, Inc., Camarillo, CA (US)

( * ) Notice: Subject to any disclaimer, the term of this patent is extended or adjusted under 35 U.S.C. 154(b) by 894 days.

(21) Appl. No.: 11/556,840

(22) Filed: Nov. 6, 2006

(65) Prior Publication Data

US 2008/0109715 A1     May 8, 2008

(51) Int. Cl.
*G06F 3/00*     (2006.01)

(52) U.S. Cl.
USPC ............................................. 715/222

(58) Field of Classification Search
USPC ......... 715/221, 222, 223, 234, 243, 254, 752, 715/753; 707/102, 601, 802, 803, 804, 805, 707/807
See application file for complete search history.

(56) References Cited

U.S. PATENT DOCUMENTS

| | | | | |
|---|---|---|---|---|
| 5,495,567 A * | 2/1996 | Iizawa et al. | ................... | 715/762 |
| 5,953,731 A * | 9/1999 | Glaser | ........................... | 715/234 |
| 6,353,446 B1 * | 3/2002 | Vaughn et al. | ................ | 715/733 |
| 6,385,655 B1 * | 5/2002 | Smith et al. | ..................... | 709/232 |
| 6,397,221 B1 * | 5/2002 | Greef et al. | ........................... | 1/1 |
| 6,415,284 B1 * | 7/2002 | D'Souza et al. | ...................... | 1/1 |
| 6,456,308 B1 * | 9/2002 | Agranat et al. | ................ | 715/854 |
| 6,629,081 B1 * | 9/2003 | Cornelius et al. | ............... | 705/30 |
| 6,662,199 B1 * | 12/2003 | Flight et al. | ........................... | 1/1 |
| 6,665,685 B1 * | 12/2003 | Bialic | ................... | 1/1 |
| 6,968,500 B2 * | 11/2005 | Mikhailov et al. | ............. | 715/221 |
| 7,010,546 B1 * | 3/2006 | Kolawa et al. | ......................... | 1/1 |
| 7,203,699 B2 * | 4/2007 | Bellamy | ................................ | 1/1 |
| 7,225,197 B2 * | 5/2007 | Lissar et al. | ........................... | 1/1 |
| 7,469,270 B1 * | 12/2008 | Kirkpatrick et al. | .......... | 709/206 |
| 7,610,233 B1 * | 10/2009 | Leong et al. | .................... | 705/37 |
| 7,665,014 B2 * | 2/2010 | Kristiansen et al. | .......... | 715/221 |
| 7,693,917 B2 * | 4/2010 | Charlot et al. | ................ | 707/804 |
| 2001/0054046 A1 * | 12/2001 | Mikhailov et al. | ............ | 707/500 |
| 2002/0180789 A1 | 12/2002 | Guttmann et al. | | |
| 2004/0010776 A1 * | 1/2004 | Shah | ............................ | 717/117 |

(Continued)

OTHER PUBLICATIONS

Database Professional—http://www.shop.avanquest.com/usa/prod.php?pid=68.

(Continued)

*Primary Examiner* — Kyle Stork
(74) *Attorney, Agent, or Firm* — Cotman IP Law Group, PLC

(57) ABSTRACT

A system and method for creating integrated web form and database applications. One or more embodiments of the invention enable a system and method for creating integrated web form and database applications. The system enables click-and-drag form creation and automatically codes the markup, validation script and database schema. The system does not require programming to create forms or a database schema to associate form data with. In addition, the system does not require programming for integrating forms and a database. By generating the schema to implement a form, a non-database programmer such as a designer can create web forms that store and display data to and from a database without programming any software. In this manner, designers can perform tasks that heretofore have required software engineers.

18 Claims, 8 Drawing Sheets

(56) References Cited

U.S. PATENT DOCUMENTS

| | | | |
|---|---|---|---|
| 2004/0036719 A1 | 2/2004 | Van Treeck | |
| 2004/0049737 A1* | 3/2004 | Hunt et al. | 715/513 |
| 2004/0243929 A1 | 12/2004 | Jones et al. | |
| 2005/0154742 A1* | 7/2005 | Roth et al. | 707/100 |
| 2005/0246627 A1 | 11/2005 | Sayed | |
| 2006/0004725 A1* | 1/2006 | Abraido-Fandino | 707/3 |
| 2007/0005634 A1* | 1/2007 | Selca et al. | 707/102 |
| 2007/0143339 A1* | 6/2007 | Springett | 707/103 R |
| 2007/0288837 A1* | 12/2007 | Eaves et al. | 715/505 |
| 2008/0195934 A1* | 8/2008 | Kim | 715/235 |

OTHER PUBLICATIONS

Form Site—http://www.formsite.com/.
Filemaker Pro—http://www.filemaker.com.
Form Spring—http://www.formspring.com/.
LogiForms—http://www.logiforms.com/.
Form 2db!!—http://www.form2db.com.
Quask—http://www.quask.com/en/home.asp.
FormMaker Pro—http://www.form-maker.com/features-list.html.
phpForms—http://phpforms.net/.
International Search Report, dated Sep. 16, 2008.

* cited by examiner

Figure 5 ized functionality. By removing the need for database and programming skills to generate a database application, designers with knowledge of HTML and CSS for example can integrate form generation with database creation in a robust environment that allows for rapid database application development.

SYSTEM AND METHOD FOR CREATING INTEGRATED WEB FORM AND DATABASE APPLICATIONS

BACKGROUND OF THE INVENTION

1. Field of the Invention

Embodiments of the invention described herein pertain to the field of computer systems. More particularly, but not by way of limitation, one or more embodiments of the invention enable a system and method for creating integrated web form and database applications.

2. Description of the Related Art

Current solutions for creating web forms and databases generally make use of distinct applications and skill sets that do not allow for a single worker to easily generate and maintain a web form and database application. Current generation form editors include WYSIWYG (What You See Is What You Get) form editors that allow for the creation of forms through the graphical placement of form elements such as text fields and check boxes. Generally, markup-based applications use HTML tables in the form generation process and do not use CSS for form element placement. Furthermore, there is no coupling of a generated HTML table form with a relational database. Current database generation interfaces allow for complex schema generation but do not generally allow a form designer to easily create a database or maintain the database. Hence, although applications exist in each area, there is no bridge between the application domains which leads to more effort, more required skill for generating an application and more cost.

An example scenario for a currently known system is as follows: A web-design client orders an online web form to collect visitor information from a website and organize the collected information into a searchable database. In this scenario at least one web designer generates a form with a graphical form designer and saves the form as markup. Another worker, for example a database programmer, interfaces with the web designer and generates a database that will store the information associated with the form. The web designer updates the form based on input from the database programmer and ensures that the form stores and updates data from the form. If the desired visitor information set changes, then both the web designer and the database programmer are required to alter their respective work pieces and retest the system. Updates to existing database records is the responsibility of the database programmer or administrator. Any administration interface would likewise require changes by both the web designer and the database programmer to account for the underlying schema changes.

One existing solution, "Database Professional" for example allows for database creation. Another solution "Form Maker Pro" allows for form creation. Neither of these solutions allow for total integrated form and database creation and as such are standalone solutions that require other software packages to implement the functionality that they themselves are not equipped to create.

Other existing solutions such as "FormSite" and "FileMaker Pro" allow for form generation based on an existing database. The problem with these solutions lies in the fact that the schema is static for these solutions and the database is of a fixed type that the end user has no control over. In the case of "FormSite" the database is stored on their server and there is no method of moving the database or using a database on any other server. In the case of "FileMaker Pro" the only database supported is FMP.

Yet other existing solutions "Logiforms" and "Quask" allow for form creation and import of XML to a local database. These solutions require local databases. As such a remote database may not be interfaced with. In the case of "Logiforms" local database utilization requires a per month payment to keep the system operational. In the case of "Quask", the database resides on the local personal computer.

For at least the limitations described above there is a need for a system and method for creating integrated web form and database applications.

BRIEF SUMMARY OF THE INVENTION

One or more embodiments of the invention enable a system and method for creating integrated web form and database applications. The system enables click-and-drag form creation and automatically codes markup, validation script and database schema corresponding to the form. The system does not require a programming effort to create forms or a database schema to associate form data with. In addition, the system does not require a programming effort for integrating forms and a database. By generating the schema to implement a form, a non-database programmer such as a designer can create web forms that store and display data to and from a database without writing any software. In this manner, designers can perform tasks that heretofore have required software engineers. In addition, generation of a web form may be accomplished by integrating with an existing web page. In this manner, previously generated work is not wasted. The system may also include logic and rules to determine the most appropriate location for a form in a given web page layout.

One or more embodiments of the invention utilize functional modules such as a code generation module to automatically generate markup, script or program code. In one or more embodiments, the generated functionality implements a model-view-controller (MVC) design pattern. This design pattern delineates the responsibilities for particular modules into model (database), view (forms) and controller (the software that integrates the model with the controller). The system generates markup, script for the view and schema generation data definition language (DDL) commands for the model. In addition, the system also generates integration code that includes data manipulation language (DML) commands and may include, for example, the generation of an administration module for performing searches.

The system creates the markup for a form, and markup for an administration web page if desired, using a WYSIWYG form editor that integrates with a markup generator which creates markup as form elements are dragged and moved onto a palette. Validation code generation is performed at this time to limit values that are allowed in particular form elements. Validation may include multiple form elements, for example, the value allowed in one form element may depend on the value in another form element. In addition, the hiding or display of particular form elements is also achieved in a similar manner through script. In this way, selection of a particular value in a list, for example, may change the form elements that are displayed in association with the selected list value.

In one or more embodiments of the invention, DDL is generated that couples with a freeware database such as MySQL. By supporting freeware databases, the system lowers the cost for creation of web pages that implement form based database interfaces. For advanced users, the generated DDL or DML may be modified to provide custom functionality or optimization. This allows for expert users to fully optimize their implementations.

Embodiments of the invention also allow for the import of existing HTML forms so that the code generation module of the system can create backend database, HTML code and validation structures to support the form without requiring a time consuming and expensive programming effort. Furthermore, the database associated with the form can be virtually anywhere. The system merely needs to access the database at the given URI to obtain a connection.

The system supports generation of an administration module that allows for multi-field searches and maintenance of the database through a web based interface. This allows for personnel that are not programmers or database administrators to also perform tasks that are normally beyond their skill set. The administration system also enables report generation. In addition, non-administrative users (NAUs) may access the administrative module to search the database according to a restricted policy that limits the fields and records that may be accessed. The NAUs may access the administrative module at a URL that differs from the URL that an administrator accesses, or conversely, the login information may result in the generation of different views for a NAU versus an administrator. Any method of logging in may be performed by administrators or NAUs. In addition, policies may be employed to limit the report that are accessible to both administrators and NAUs.

After generating a form and associated schema, the system publishes the form to the web and can install, for example, an administration module on a website. In addition, the SQL file representing the schema is uploaded to the server and executed to create the database. The form may be saved and returned to later for completion using one or more embodiments of the invention. The system may delete forms that are abandoned and may send reminders to users that given forms needed to be completed. The system may store the forms on any computer associated with the system including a server or user associated computing device. Embodiments of the invention may upload any other file created in concert with the SQL file, for example, a cascading style sheet (CSS) file.

In one or more embodiments, a wizard based generation method is utilized for viewing or editing a form, form markup/script code, schema, administration form and for publishing the form to a website. Use of a wizard-based method may be bypassed by more advanced users in one or more embodiments.

BRIEF DESCRIPTION OF THE DRAWINGS

The above and other aspects, features and advantages of the invention will be more apparent from the following more particular description thereof, presented in conjunction with the following drawings wherein:

FIG. 2 is a view of a form generation interface.

FIG. 3 is a view of a code generation or markup/script code interface.

FIG. 5 is a view of an administration interface.

DETAILED DESCRIPTION

A system and method for creating integrated web form and database applications will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
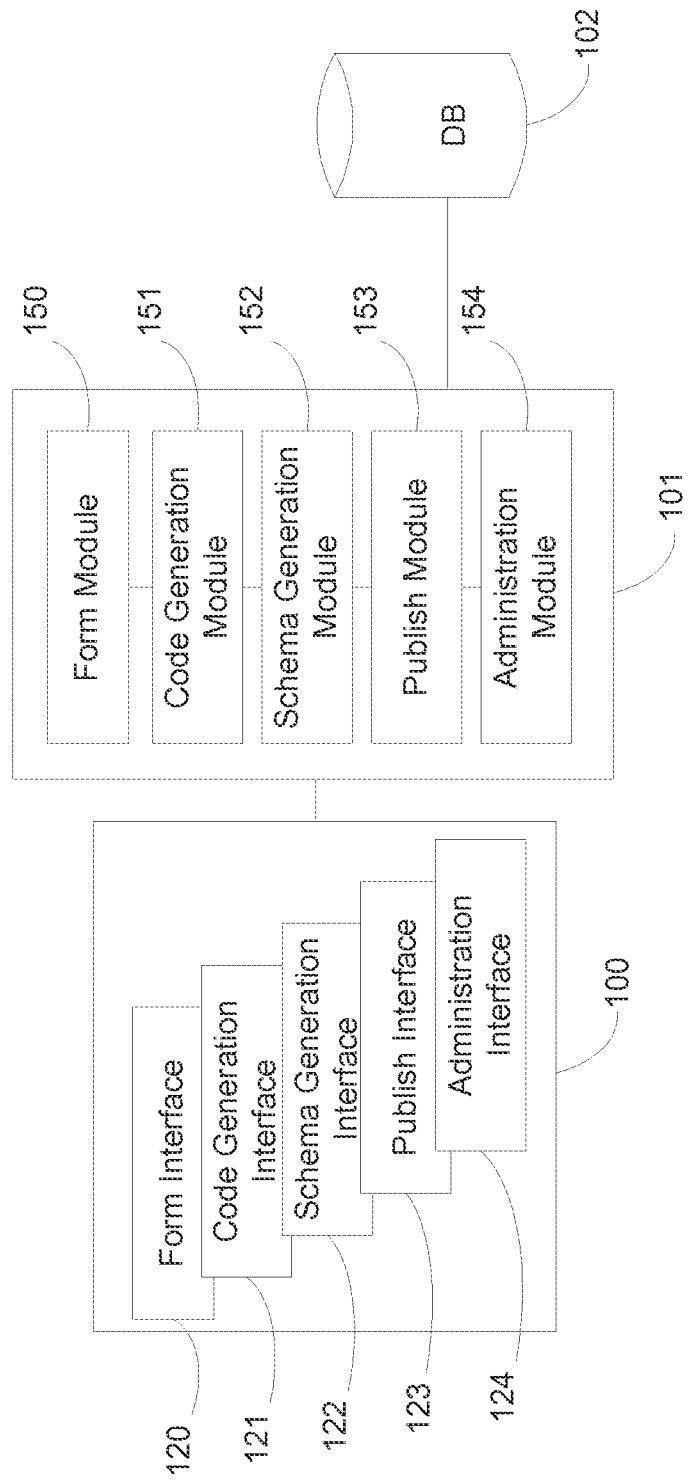
FIG. 1 is a system diagram of an embodiment of a system configured to create integrated web form and database applications.

FIG. 1 is a system diagram of an embodiment of a system configured to create integrated web form and database applications. The system makes use of presentation device 100 and computer 101 in association with database 102. Computer 101 may be a personal computer or server depending on the embodiment. Database 102 may be coupled with a server directly or indirectly. In a multi-tier embodiment a web interface is utilized in presenting information via presentation device 100 via a web server hosted on computer 101 while an application server hosts modules on computer 101 or another server between computer 101 and database 102 (not shown for brevity) while optionally database 102 is hosted on a separate database server. Firewalls and virtual private networks or any other security device may be utilized between any tier in any embodiment of the invention in keeping with the spirit of the invention.

The system enables click-and-drag form creation via form interface 120 in conjunction with form module 150. The system automatically generates markup and validation script using code generation module 151 and displays and allows for modification of the generated markup and script via code generation interface 121. In addition, the system creates a database schema corresponding to the form using schema generation module 152 and displays and allows for modification of the schema via schema generation interface 122. The system does not require a programming effort to create forms or a database schema to associate form data with. Furthermore, the system does not require a programming effort for integrating forms and a database. By generating the schema to implement a form, a non-database programmer such as a designer can create web forms that store and display data to and from database 102 without creating any software. In this manner, designers can perform tasks that heretofore have required software engineers.

One or more embodiments of the invention utilize functional modules 150-154 such as a code generation module to automatically generate markup, script or program code. In one or more embodiments, the generated functionality implements a model-view-controller (MVC) design pattern. This design pattern delineates the responsibilities for particular modules into model (database 102), view (for example a web page displayed on any presentation device such as presentation device 100) and controller (the software that accepts user inputs, updates database 102 and presentation device 100, namely a web component that receives the form inputs and stores the inputs into database 102). The system generates markup, script for the view and schema generation data definition language (DDL) commands for the model as will be described in conjunction with the remaining figures. In addition, the system also generates integration code that includes data manipulation language (DML) commands and may include, for example, the generation of administration module 154 for performing searches. Embodiments of the invention may leverage existing web pages and existing RDBMS schemas to augment existing work product. In this manner, an existing web page may be utilized, for example, to create a form oriented CSS version of an existing web page. Leveraging existing work product allows for web sites that are in need of database information to be enhanced without requiring regeneration of web pages that have already been created.

Figure 2:
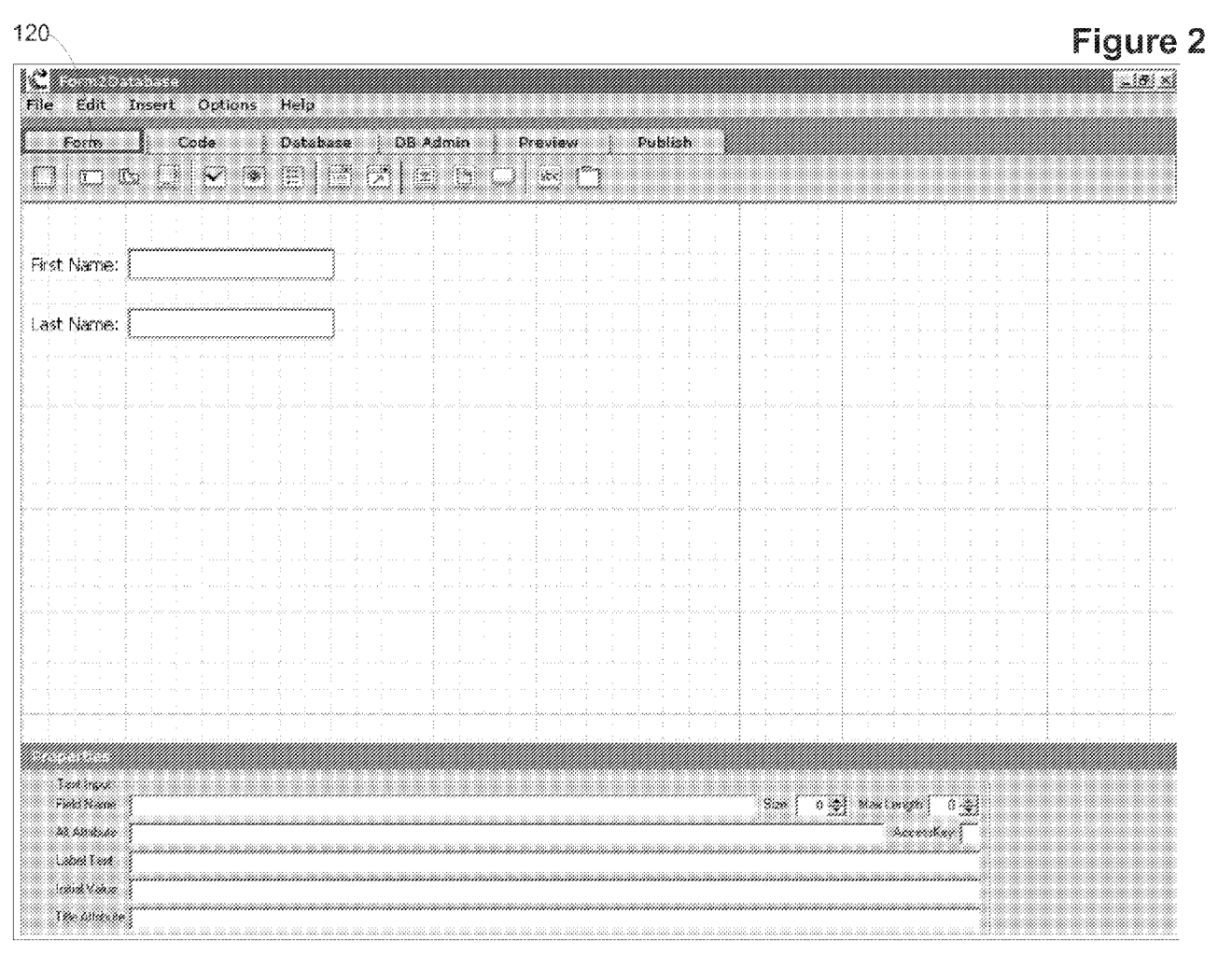

FIG. 2 is a view of form generation interface 120 which in this embodiment is a subcomponent of a tab based interface although this is not required. The system presents form interface 120 via form module 150 and creates markup for a form, and optionally markup for an administration web page if desired, using a WYSIWYG form interface 120 that integrates with HTML code generator module 151. Code generator module 151 creates markup as form elements are dragged and moved onto a palette of form interface 120 or when code is manually edited using code generation interface 121. For example, form label elements "First Name:" and "Last Name:" are dropped onto the grid shown in the form window in FIG. 2 which in one embodiment of the invention forwards the movements and user actions from form module 150 to code generation module 151. In one or more embodiments of the invention cascading style sheet markup is utilized to control the positioning of form elements that are to be displayed in a form.

Figure 3:
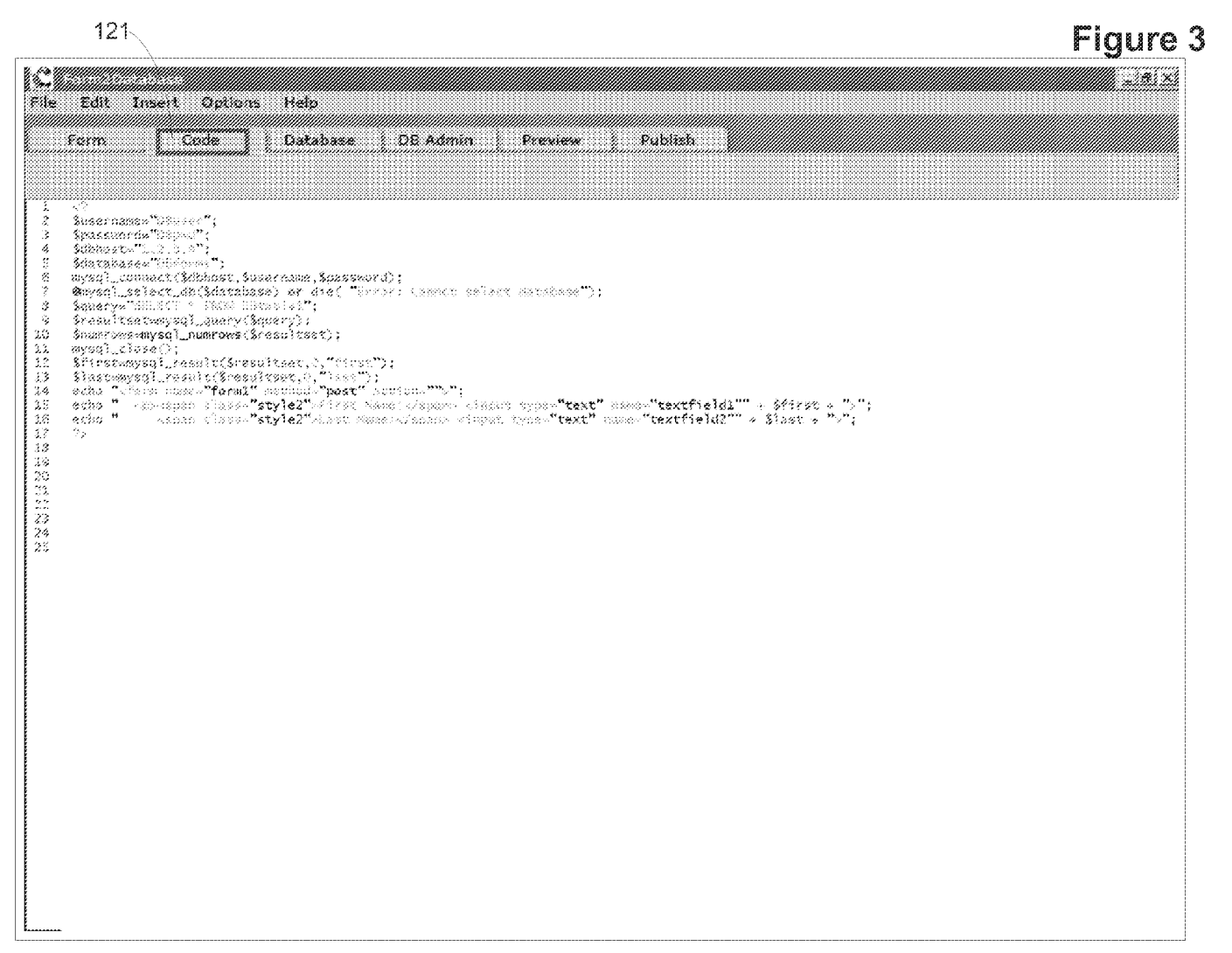

If the user desires to visually inspect the code then the user may display code generation interface 121. FIG. 3 is a view of a code generation or markup/script code interface. For the form definition displayed in FIG. 2, the corresponding markup is shown in FIG. 3 in the main markup window. In this example, the two labels and two text fields shown in FIG. 2 are shown implemented in code, namely the labels are shown as sub-elements of a SPAN directive and the text fields are implemented as HTML inputs of type TEXT.

The code displayed in FIG. 3 will auto-fill the first and last name if the entry exists in the database using the PHP code below. This example is intended to show an embodiment that auto-fills a first and last name in a form and as such is not limited to the PHP implementation or functionality of this example as one skilled in the art will recognize.

TABLE 1 code displayed FIG. 3.

```
<?
$username="DBuser";
$password="DBpwd";
$dbhost="1.2.3.4";
$database="DBforms";
mysql_connect($dbhost,$username,$password);
@mysql_select_db($database) or die( "Error:
Cannot select database");
$query="SELECT * FROM DBtable1";
$resultset=mysql_query($query);
$numrows=mysql_numrows($resultset);
mysql_close( );
$first=mysql_result($resultset,0,"first");
$last=mysql_result($resultset,0,"last");
echo "<form name="form1" method="post" action="">";
echo "      <p><span   class="style2">First   Name:</span>
<input   type="text" name="textfield1"" + $first + ">";
echo "        <span   class="style2">Last   Name:</span>
<input   type="text" name="textfield2"" + $last + ">";
?>
```

In this exemplary PHP code set, a database named "DBforms" at URL $dbhost is connected to through the mysql_connect cell. A query is performed and the first resultset "$first" name (if one exists) is placed, for example, in the text field corresponding to the "First Name" label as a default value. Similarly, the first "$last" name returned in the query is placed, for example, in the text field corresponding to the "Last Name" label as a default value. The "echo" functions result in the generation of the text that follows to be output. In this example, HTML "<form . . . " markup is generated. In addition, a link to a cascading style sheet (CSS) may be included in this code set to link with an external style sheet generated by an embodiment of the invention. For example, the link "<link href="styles1.css" rel="stylesheet" type="text/css">" may be included in a PHP echo statement that allows for an external CSS file to control the layout and presentation of the form. In this case, "styles1.css" is created by an embodiment of the invention for this purpose. As one skilled in the art will recognize, any formatting or positioning directives may be included in the stylesheet.

Javascript validation may be selected in the form interface of FIG. 2 by right clicking on a form element that accepts input and selecting an appropriate validation. Validation code generation may be manually entered or edited by a user by adding or altering script directly in the main window of code generation interface 121. For example a validation may be entered by right-clicking on a form element such as the text field next to label element "First Name:" and selecting a validation type from a list, for example, or for selecting an existing name from a table in a database by selecting a database name validation selection and selecting the table name and field in which to limit the input. Any other validation such as numeric validation or validation of values between multiple fields is in keeping with the spirit of the invention. For example, validation may include multiple form elements, e.g., the value allowed in one form element may depend on the value in another form element. In addition, the hiding or display of particular form elements is also achieved in a similar manner through script. In this way, selection of a particular value in a list, for example, may change the form elements that are displayed in association with the selected list value. By utilizing script to perform validation, round-trips to the server may be avoided in many cases, thereby speeding execution of the application. Using schema generation interface 122 allows for a user to change, for example, the relationships between tables, change keys or perform any other database-related function.

Figure 4:
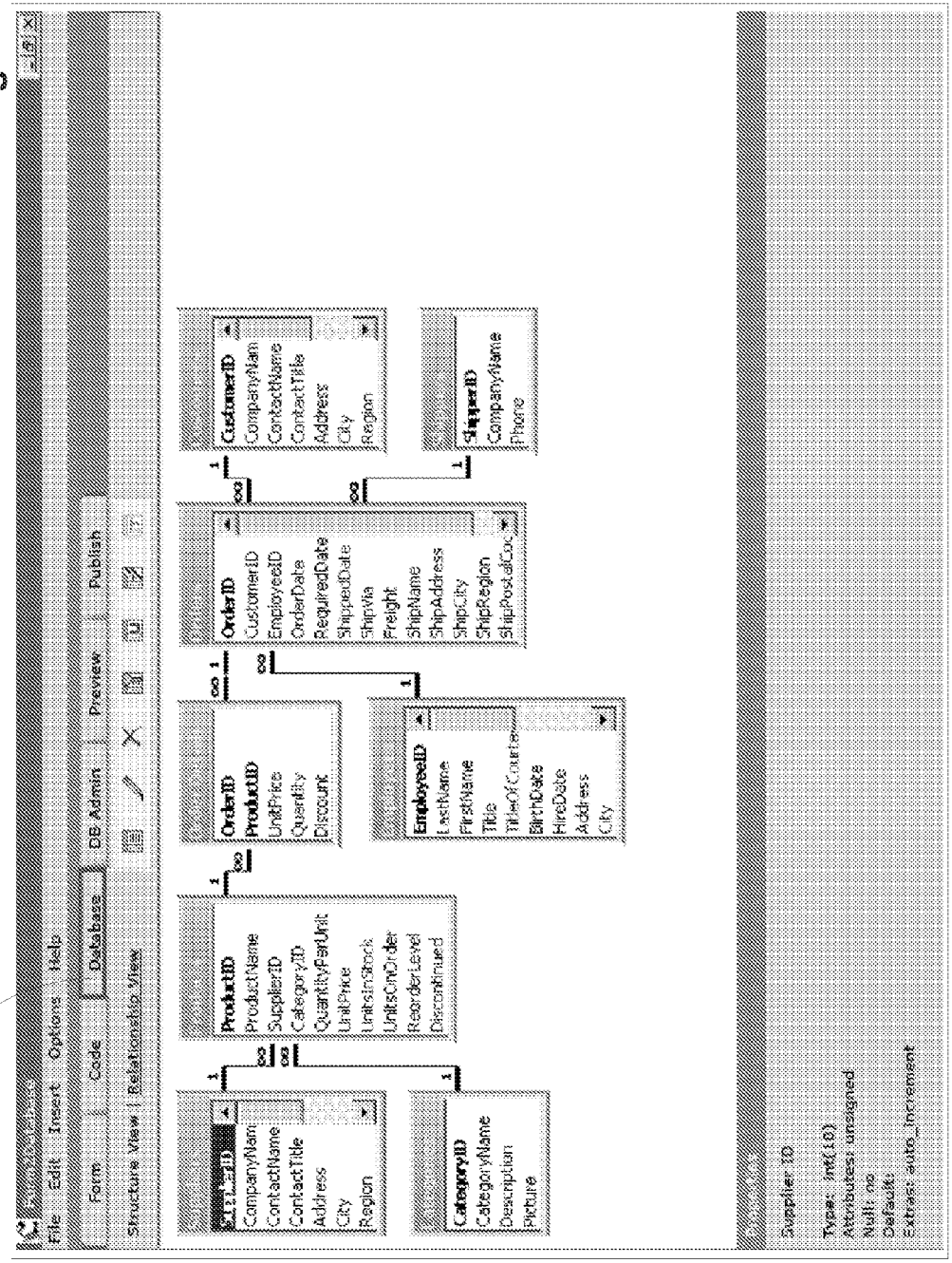
FIG. 4 is a view of a schema interface.

FIG. 4 is a view of schema interface 122. In one or more embodiments of the invention, DDL is generated that couples with a freeware database such as MySQL. By supporting freeware databases, the system lowers the cost for creation of web pages that implement form based database interfaces. For advanced users, the generated DDL or DML may be modified to provide custom functionality or optimization. This allows for expert users to fully optimize their implementations. In this embodiment of schema interface 122, an expert user may alter the schema that has been previously selected through use of a predefined schema list associated with commonly used forms via a menu in form interface 120 or in any other manner of interfacing with form interface 120. Alternatively, the system may also present a base schema by scanning interface element names and determining for example that a "First Name" and a "Last Name" combined with a "Product ID" label on a form has a high probability of a store front schema, and as such the system may auto-select a schema associated with a store front web application. Alternatively, the user may manually enter or edit a schema if the user is skilled in creating database schemas. Any database connection code may also be inserted by the user or system during the code generation process.

Embodiments of the invention also allow for the import of existing forms so that the code generation module of the system can create backend database structures to support the form without requiring a time consuming and expensive programming effort. By importing an existing HTML/PDF or any other form including markup-related forms such as XML-based forms, via form interface 120, code generation module 151 and schema generation module 152 may be invoked by the system in order to generate markup and SQL commands to implement the form. The system does not limit the location of a database or type of the database in any way. The system merely needs to access the database at the given URI to obtain a connection and interface with the database to create, read, update and delete data associated with a particular form. The form may be saved and returned to later for completion using one or more embodiments of the invention. The system may delete forms that are abandoned and may send reminders to users that given forms needed to be completed. The system may store, for example, the forms on any computer associated with the system including personal computer or server 101.

Figure 5:
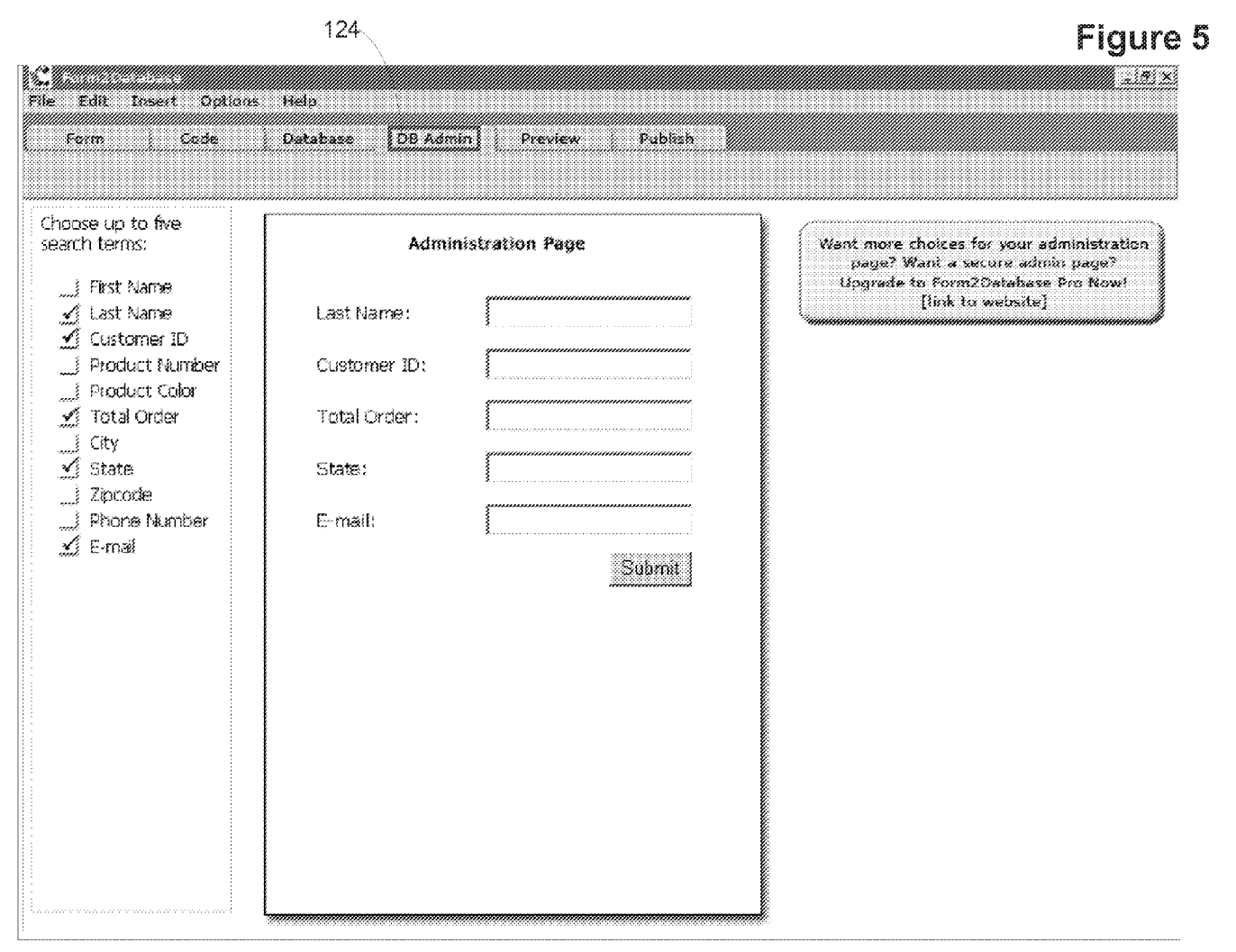

FIG. 5 is a view of administration interface 124. The system supports generation of an administration interface that allows, for example, for multi-field searches and maintenance of the database through a web based interface. By presenting commonly searched fields and accepting user input as to which fields to utilize for administratively accessing the database, a codeless administrative generation process is achieved. This allows for personnel that are not programmers or database administrators to create administrative interfaces that are normally beyond their skill set. The administration system also enables report generation and may interface to any other system configured to generate reports based on a database. Input of password fields or any other authorization or authentication mechanism that may be utilized in the resulting administration interface is in keeping with the spirit of the invention. Administrators may also view a master list of forms that have been created by the system. In addition, the domains that the forms are associated may be viewed as well. The administrator module allows for the deletion of forms as well. An administrator may also send out emails to a results list based on a search. Utilizing the system to send out a targeted email to a list of users provides the capability to target email at specific users that are represented in the database. In addition, the Administrators may utilize bad-word filter, for example, a general regular expression based filter, to limit words that are not allowed on a given website.

Figure 6:
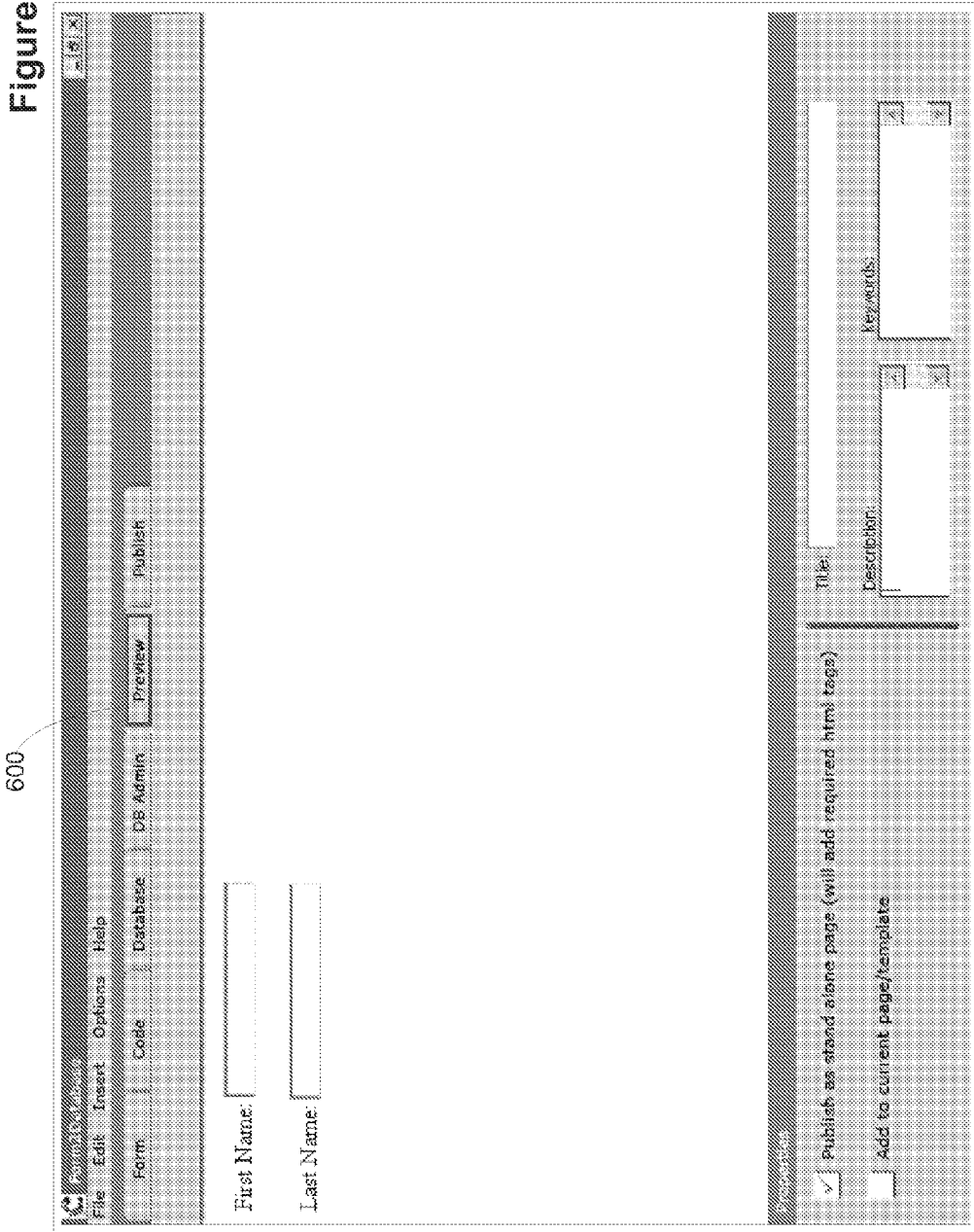
FIG. 6 is a view of a form preview interface.

FIG. 6 is a view of form preview interface 600. Form preview interface 600 allows for a user to test the form. For example, with validations associated with input elements, a user may exercise the form to test whether the validations work as intended. Any markup display component may be utilized to display form preview interface 600 including any display component that may also display XML, WML, HTML or any other type of markup language.

Figure 7:
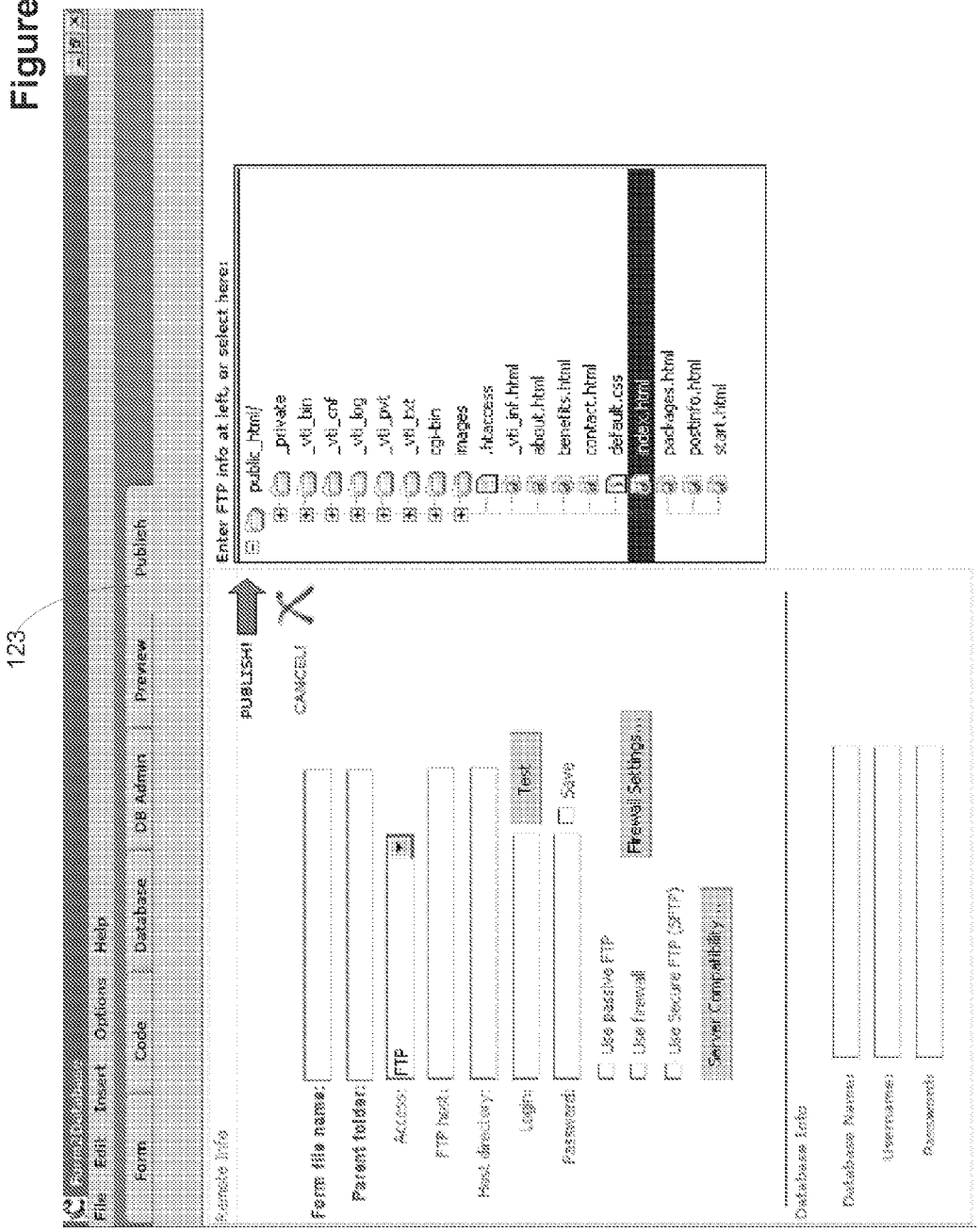
FIG. 7 is a view of a publish interface.

FIG. 7 is a view of publish interface 123. After generating a form and associated schema, the system publishes the form to the web and can, for example, install an administration module on a website. In addition, the SQL file representing the schema is uploaded to the server and executed to create the database. The user simply selects a server to publish to using the left side of publish interface 123, selects the particular directory to publish to using the right side of publish interface 123 and selects the database information at the bottom of publish interface 123 and clicks on the "publish" icon in the middle of the top of the window. In one or more embodiments of the invention, multiple interface components that implement each of the main browsers in use may be utilized. For example, an Internet Explorer® or Firefox browser or browser component or any cell phone compatible browser, for example, may be utilized to determine if each browser component displays the form properly. Embodiments of the invention may upload any other file created in concert with the SQL file, for example, a CSS file.

In one or more embodiments, a wizard based generation method is utilized for viewing or editing a form, form markup/script code, schema, administration form and for publishing the form to a website. Use of a wizard based method may be bypassed by more advanced users in one or more embodiments.

Figure 8:
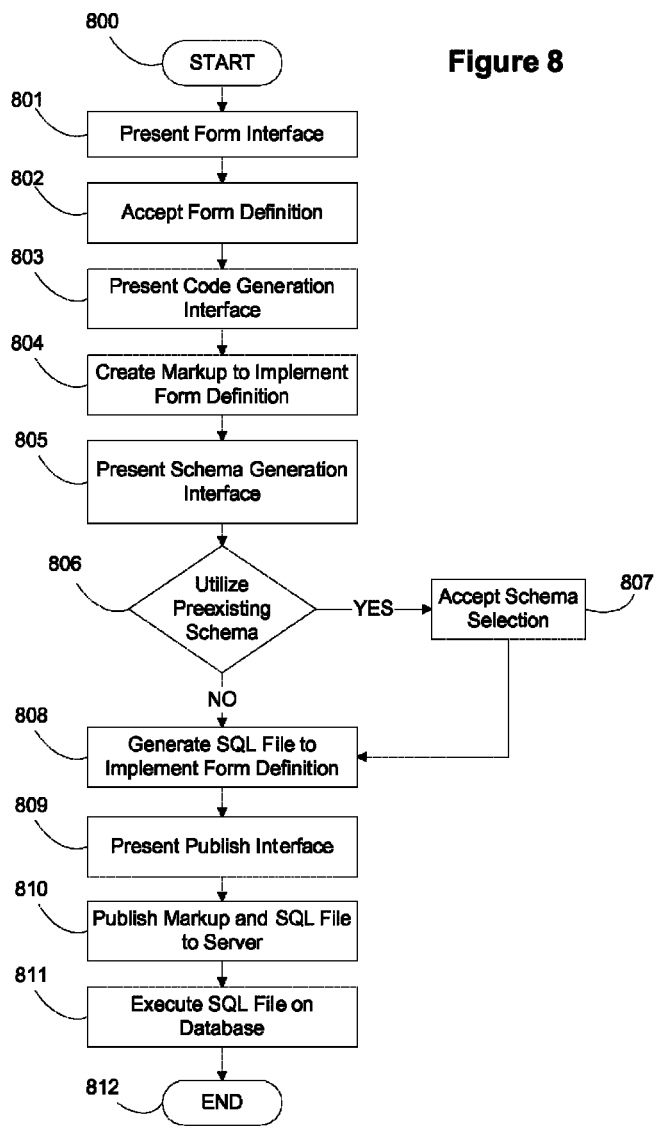
FIG. 8 is a flow chart of an embodiment of a method for creating integrated web form and database applications.

FIG. 8 is a flow chart of an embodiment of a method for creating integrated web form and database applications. Processing starts at 800. A form presentation interface is presented at 801. Any method of presenting the interface is in keeping with the spirit of the invention including displaying a web based form interface in a browser window or, for example, a standalone application window on a personal computer. A user drags and drops form elements to create a form and adjust the form to meet the visual needs of the user and at this time the user may also input validation commands to control the data that is allowed in the form elements. The system accepts a form definition at 802 which includes all form elements and any validation script that has been entered or selected by the user. The form definition is scanned by the system and the system presents a code generation interface at 803. Again, any type of web based or standalone application based interface may be utilized in the code generation interface or any other interface described herein. The system creates the markup to implement the form definition at 804 which is thus displayed in the code generation interface. In addition, any supporting presentation files may be generated at this time, for example, a CSS file. The user may choose to enter more markup or validation script using the code generation interface if desired, however doing so requires a skill set that many web designers may or may not possess. Hence, modification of generated markup is left to the individual user depending on their skill set and desire for customization. The system presents the schema generation interface at 805. If the user desires to use a preexisting schema for a common type of form at 806, then the user selects a schema suggested by the system based on the form input elements included on the form interface. The system may scan the form elements and determine that the user has a high probability of implementing a guest book, for example, in which case a schema or list of guest book schemas is presented to the user for selection. The system accepts a selection at 807 which allows for the generation of a SQL file. If the user has decided to allow the system to generate the schema based on the form definition associated with the form elements that the user has input into the system, then the system generates a SQL file to implement the form definition at 808. Optionally, the system may present code generation interface at any point in the process and the user may, for example, edit the generated schema and/or SQL file, if the user is knowledgeable in this area. The system presents a publish interface at 809. The publish interface allows for the selection of the server and directory on the server and database to which to publish the form and schema. When the user has input the settings to associate the form with the correct server, directory and database and asserts a publish command, then the system publishes markup and SQL to the server at 810. The SQL file is executed on the database at 811 if, for example, there is any change to the schema or if the SQL file has not been executed on the database before. For cases where existing data is in the database and the schema has changed between iterations, intelligent DDL commands are utilized in merging data from one schema to another. Any method of merging one schema into another is in keeping with the spirit of the invention. Processing ends at 812.

While the invention herein disclosed has been described by means of specific embodiments and applications thereof, numerous modifications and variations could be made thereto by those skilled in the art without departing from the scope of the invention set forth in the claims.

What is claimed is:

1. A system for creating integrated web form and database applications comprising:
    a form module configured to present a form interface with a visual WYSIWYG representation and a drag-and-move functionality to a user to create a form definition for at least one web form, wherein said form definition comprises a plurality of form elements;
    a form input module configured to accept the at least one web form;
    a code generation module configured to generate PHP code for said at least one web form to present with a code generation interface, wherein said code generation interface allows said user to review and manually edit said PHP code, wherein said PHP code is based on said form definition;
    a preview module configured to generate a preview interface to allow said user to test said web form;
    a publish module configured to publish said PHP code and said database schema to make said at least one web form available, wherein said web form has a visual appearance based on said visual WYSIWYG representation, wherein said publish module is further configured to send said database schema to a database server configured to implement said form definition using said schema;
    an administration module configured to generate an administration interface, wherein said administration interface allows an administrator to conduct multi-field searches by choosing fields from a set of commonly searched fields, wherein said administration interface allows said administrator to view, edit, and delete said web forms; and
    a computer configured to execute said form module, execute said code generation module, execute said schema generation module and execute said publish module,
    wherein said form module is configured to automatically generate a database schema for said at least one web form based on said plurality of form elements and to create backend database structures to support said at least one web form and generate an SQL file to implement said form definition and said schema and wherein said database schema is automatically modified and new SQL statements generated based on changes to said web form through said form interface,
    wherein said code generation module is further configured to generate database commands based on at least one of said plurality of form elements, wherein said database commands are configured to communicate data between said at least one web forms and said database server based on said form definition and said schema.

2. The system of claim 1 wherein said schema generation module is configured determine said schema by scanning text associated with said plurality of form elements to evaluate a probability of a match with a selected schema selected from a plurality of schemas associated with commonly used forms.

3. The system of claim 1 wherein said schema generation module presents a list of schemas associated with commonly used forms to a user and wherein said schema generation module accepts a selection of a schema from said list of schemas associated with said commonly used forms.

4. The system of claim 1 wherein said schema generation module determines said schema by generating a schema comprising each of said plurality of form elements in said form definition.

5. The system of claim 1 wherein said schema comprises DDL.

6. The system of claim 1 wherein said database commands comprise DML.

7. The system of claim 1 wherein said PHP code is embedded in HTML.

8. The system of claim 1 wherein said PHP code is embedded in WML.

9. The system of claim 1 wherein said PHP code is embedded in XML.

10. The system of claim 1 wherein said code generation module further generates CSS code.

11. The system of claim 1, wherein said code generation module is further configured to generate script comprising validation code configured to validate said form definition by limiting values that are allowed in particular form elements.

12. A method for creating integrated web form and database applications comprising:
    presenting a form interface, wherein said form interface is configured to provide a user interface with a visual WYSIWYG representation and a drag-and-move functionality to create at least one web form comprising a plurality of form elements;
    accepting a form definition based on said plurality of form elements;
    presenting a code generation interface configured to generate PHP code and database commands based on said form definition, wherein said code generation interface allows said user to review and manually edit said PHP code, wherein said PHP code associates with a visual appearance based on said visual WYSIWYG representation;
    creating said PHP code to implement said form definition;
    generating a database schema for said at least one web form based on said plurality of form elements;
    generating a SQL file to implement said form definition and said schema based on said PHP code, wherein said database schema is automatically modified and new SQL statements generated based on changes to said web form through said form interface;
    creating backend database structures to support said at least one web form;
    publishing said PHP code and said SQL file to a server associated with said database;
    presenting an administration interface allowing an administrator to conduct multi-field searches by choosing fields from a set of commonly searched fields and allowing said administrator to view, edit, and delete said web forms; and
    executing said SQL file on said server associated with said database.

13. The method of claim 12 wherein said generating said SQL file comprises utilization of preexisting schemas associated with commonly used forms.

14. The method of claim 12 wherein said presenting said schema interface comprises presenting a list of schemas associated with commonly used forms to a user.

15. The method of claim 12 further comprising:
    accepting a selection of a schema from a list of schemas associated with commonly used forms.

16. The method of claim 12 wherein said generating said SQL file comprises generating a schema comprising each user interface element in said form definition.

17. A non-transitory tangible computer-readable medium comprising computer-readable instructions for providing integrated web form and database applications, wherein execution of said computer-readable instructions by one or more processors causes said one or more processors to:

provide a form input interface for form creation, wherein said form input interface provides a user interface with a visual WYSIWYG representation and a drag-and-move functionality;

accept form design information from said form input interface;

generate PHP code corresponding to one or more web forms based on said form design information;

generate validation script code corresponding to said one or more web forms, wherein said validation script code is configured to limit values allowed in said one or more web forms;

generate a database schema corresponding to said one or more web forms based on said form design information;

generate schema generation data definition language commands corresponding to said one or more web forms, wherein said schema generation data definition language commands comprises SQL statements created from said PHP code, wherein said database schema and said PHP code are automatically modified and new SQL statements generated based on changes to said one or more web forms through said form input interface;

create backend database structures to support said one or more web forms;

generate integration code comprising data manipulation language commands configured to integrate data entered in said one or more web forms with said database schema;

publish said one or more web forms to a website, wherein said one or more web forms have a visual appearance based on said visual WYSIWYG representation; and present an administration interface allowing an administrator to conduct multi-field searches by choosing fields from a set of commonly searched fields and allowing said administrator to view, edit, and delete said web forms, wherein said validation script code is automatically modified based on said changes to said one or more web forms, and wherein said integration code is automatically modified based on said changes to said one or more web forms.

18. The non-transitory computer-readable medium of claim 17, wherein said form input interface comprises a click-and-drag interface for form creation.

* * * * *